May 8, 1928.
C. J. ALLEN
1,668,707
AIR CONDITIONING HUMIDIFIER
Filed Jan. 23, 1924
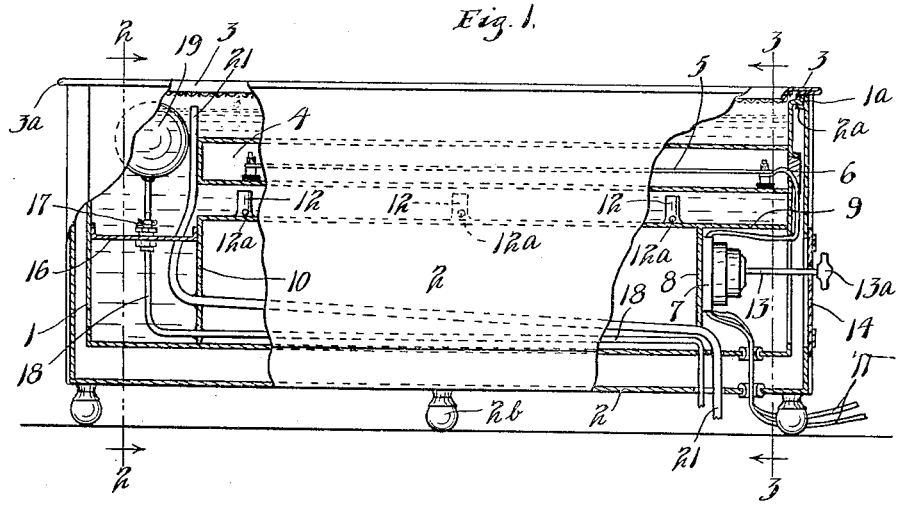
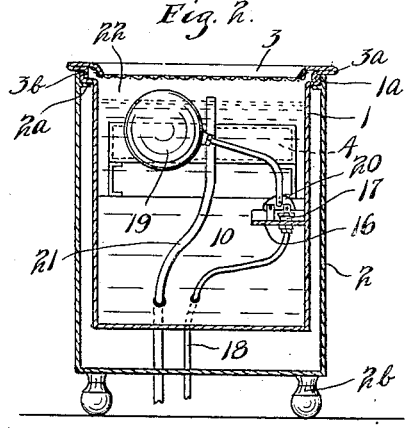 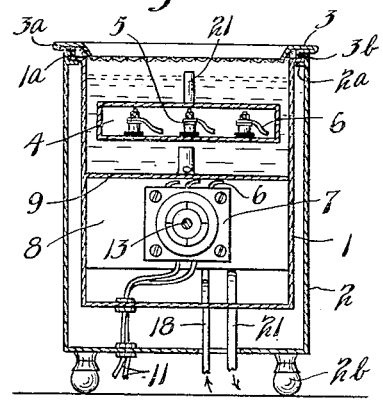
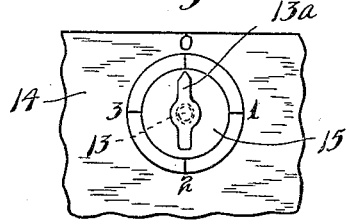
INVENTOR.
CLARK J. ALLEN.
BY HIS ATTORNEY.
James F. Williamson Patented May 8, 1928.

1,668,707

UNITED STATES PATENT OFFICE.

CLARK J. ALLEN, OF MINNEAPOLIS, MINNESOTA.

AIR-CONDITIONING HUMIDIFIER.

Application filed January 23, 1924. Serial No. 688,059.

This invention relates to an air conditioning or evaporating apparatus adapted to supply moisture or vapor to the atmosphere of a room. The value of a relatively humid atmosphere or one that is not excessively dry, both from a hygienic and other standpoints, is being increasingly emphasized by physicians and engineers. It is desirable in such a device to have means for evaporating a sufficient amount of water and also means which can be easily controlled to vary the amount evaporated. It is also desirable to have a device of simple form which can easily be kept in a clean and sanitary condition.

It is an object of this invention to provide such a device comprising a receptacle for the liquid to be evaporated and a casing extending into said receptacle adapted to be submerged in the liquid having an open end through which a heating element can be inserted to be disposed in said casing.

It is also an object of the invention to provide such a device having a heating element, preferably of electrical type, said device carrying means for controlling said element to regulate the amount of heat supplied.

It is also an object of the invention to provide the liquid receptacle as described having a shelf or false bottom therein disposed below said casing with means thereon for directing a circulation of the liquid against said casing, which latter will be heated by the heating element.

It is still another object of the invention to provide such a device with a novel and efficient cover supported on a casing enclosing said liquid receptacle.

These and other objects and advantages of the invention will be fuly set forth in the following description made in connection with the accompanying drawings in which like reference characters refer to the same parts throughout the different views, and in which, Fig. 1 is a view in side elevation of the device, a portion being shown in vertical section;

Fig. 2 is a vertical section taken on the line 2—2 of Fig. 1, as indicated by the arrows;

Fig. 3 is a vertical section on the line 3—3 of Fig. 1, as indicated by the arrows; and Fig. 4 is a partial end view of the device.

Referring to the drawings, the device comprises a receptacle 1, preferably made of metal, which may be suitably coated or painted. While the receptacle 1 may be made of various forms, in the embodiment of the invention illustrated, the same is shown as of rectangular shape. Receptacle 1 is provided with an offset portion at its upper edge providing a flange 1ª which is adapted to rest upon an inwardly extending flange 2ª of an enclosing casing 2 also of rectangular shape and provided at its bottom with spaced legs 2ᵇ illustrated as of ball shape. The casing 2 can be disposed upon the floor of the room or on any other convenient support in the room. A cover 3 is provided, the greater and central portion of which is formed of screen or reticulate material and which has a surrounding imperforate flange 3ª formed of folded sheet metal. The inner part of the flange 3ª extends downwardly and inwardly in the receptacle 1 and has a screen soldered or otherwise secured thereto. Said flange extends horizontally and is folded upon itself and provided with a vertical flange 3ᵇ fitting within the offset portion at the top of receptacle 1. Receptacle 1 has a casing 4 illustrated as of shallow and elongated rectangular shape extending thereinto from one end, the outer end of said casing being open so that a heating member 5 can be inserted through said end and disposed in said casing. Said heating element is illustrated as of electrical type and is connected to a plurality of conductors 6 shown as three in number, which extend to a switch device 7. The switch device 7 is mounted upon a vertical wall or flange 8 extending across receptacle 1 and engaging at its top and secured to a shelf or false bottom 9 extending across receptacle 1 and substantially the entire length thereof but which terminates at the vertical wall 10 adjacent the other end of receptacle 1. A pair of conductors 11 extend from the switch 7 and preferably will be constructed in the form of the usual cord having a plug at the end and adapted to be connected to an electric current supply socket or switch. A rod 13 extends outwardly from switch 7 and is provided with a handle 13ª outside of the casing 2 and at the end thereof, which handle is in the shape of a pointer and co-operates with a dial 15 on the outer end of casing 2, said dial having indicating marks thereon indicating the off position of the switch as zero and the different heat supplying positions thereof as 1, 2 and 3. The end of casing 2 preferably is made in the form of a door 14 which can be opened to give access to the switch 7 and the heating member 5. Secured to and extending upward from the top of the shelf 9 is a plurality of shell members 12, each comprising a hollow cylinder open at its upper end and having one or more openings 12ª at its base. A shelf 16 is provided extending between the vertical wall 9 and the adjacent end of casing 1 in which is disposed a valve 17 connected to a water supply pipe 18 which extends downwardly from the shelf 16 through the wall 10 beneath the shelf 9 and beneath flange 8 where it passes through the bottom of receptacle 1 and casing 2. Said supply pipe will be connected to some source of liquid supply such as the usual city water supply. The valve 17 is adapted to be opened and closed by means of a float 19 carried on a rod secured to a valve control lever 20 which is pivoted to an upstanding member on shelf 16. An overflow pipe 21 extends through the shelf 16 and up along the inner end of casing 4, which pipe also extends below the shelf 16 and passes through wall 10 and extends beneath shelf 9 and flange 8 where it also passes out at the bottom of receptacle 1 and casing 2, said pipe being connected to some suitable drain.

In operation, the device will be disposed in a desired place in the room and conductors connected to a suitable source of electric energy. The pipe 18 will be connected to a suitable water supply so that a supply of water is maintained in tank 1, as indicated by the water level line 22. This level will be maintained by the action of float 19 and valve 17. The switch 7 now being operated to supply electric current to the heater 5, casing 4 will be heated and this will effect a rapid vaporization or evaporization of the water in the tank. The water above shelf 9ª passes into the interior of the shells 12, will pass upward therethrough and be directed against the bottom of casing 4 and will be effectively heated by coming in contact with said bottom on which rests the heater 5. The vapor rises readily from the tank 1 through the screen 3 and yet the screen will effectively prevent the entrance of foreign articles into said casing so that the water will not become poluted. Any water of condensation on cover 3 will be directed back into receptacle 1 by the inwardly inclined flange on cover 3. Should the water rise too high, the water will run out through the overflow pipe 21 which will be connected with a suitable drain. If the atmosphere of the room is sufficiently humid or saturated, the switch 7 can be operated, when desired, to discontinue the vaporization of the water, or to furnish a less degree of heat. The device will thus evaporate water at different rates, depending upon the condition of the atmosphere in the room. The tank 1 can readily be cleaned, when desired, by removing the lid or cover 2, and access may be had to the switch 7 and heater 5 by opening the door at the end of casing 2.

From the above description it is seen that applicant has provided an extremely simple and efficient air conditioning device. The device can be made to suit various locations and conditions and can be disposed where desired and thus does not have to be placed on top of a heat radiator. The heater 5 can be heated, as desired, to supply the necessary moisture so that the humidity in the room can be kept practically constant, which is not possible where the humidifier rests on and depends on the heat from the radiator for evaporization. The heating element 5 is readily removable and can easily be removed through the open end of casing 4. The members 10 provide an efficient circulation of the water to bring the same against the heated casing 4. The device has been demonstrated in actual practice and found to be very efficient and successful for the purpose intended. A large amount of water can be evaporated if necessary to afford the proper humidity. Obviously, the casing 2 and cover 3 may be coated or ornamented as desired.

It will, of course, be understood, that various changes may be made in the form, details, arrangement and proportions of the parts without departing from the scope of applicant's invention, which, generally stated, consists in a device such as shown and described and set forth in the appended claims.

What is claimed is:

1. An air conditioning apparatus comprising a tank adapted to contain liquid to be evaporated, a chamber extending into said tank through one wall thereof and open at one end, heating means in said chamber, and a shelf in said tank beneath said chamber with means thereon to circulate the water and direct the same against the wall of said chamber.

2. An air conditioning apparatus comprising a tank adapted to contain liquid to be evaporated, a casing extending into said tank through one wall thereof and having an open outer end, and electric heating means disposed in and being insertable into said casing through said open outer end, means in said tank for maintaining a constant level of liquid therein, said tank having a chamber containing a controlling element for said heating means, a second casing in which said tank is disposed, said tank being spaced from said casing at its sides and bottom, and a removable reticulate cover for said tank having a rim resting on said last mentioned casing.

3. An air conditioning apparatus comprising a tank adapted to contain the liquid to be evaporated, a reticulate cover for said container, a casing extending into said tank through one wall thereof having an open outer end, a heating means disposed in and insertable into said casing through said open outer end, said heating means being supported upon the bottom of said casing, a shelf in said tank beneath said casing, and circulating means for the liquid directing the same against the bottom of said casing, said last mentioned means comprising a hollow cylindrical member having perforated sides and open upper ends supported on said shelf with said open upper ends in close proximity to the bottom of said casing.

4. The structure set forth in claim 2, a handle for said controlling means extending through said outer casing, and forming an indicating means, and a dial on the exterior of said latter casing with which said handle co-operates.

5. The structure set forth in claim 2, a false bottom in said tank disposed beneath and adjacent said first casing, and shells having open upper ends and perforated sides supported on said false bottom.

6. A humidifier comprising a rectangular casing, a container disposed therein spaced from the walls and bottom of said casing and supported adjacent the top of said casing, an elongated casing projecting into said container through one side wall thereof, having an open outer end, an electrical heating element disposed in said elongated casing, said first mentioned casing having a door therein to give access to said heating element and means for regulating the degree of heat of said element.

In testimony whereof I affix my signature.

CLARK J. ALLEN.